United States Patent
Wang (10) Patent No.: US 12,402,068 B2
(45) Date of Patent: Aug. 26, 2025

(54) NETWORK ACCESS CONTROL METHOD AND DEVICE, AND STORAGE MEDIUM

(71) Applicant: TENCENT TECHNOLOGY (SHENZHEN) COMPANY LIMITED, Shenzhen (CN)

(72) Inventor: Tao Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 506 days.

(21) Appl. No.: 17/411,510

(22) Filed: Aug. 25, 2021

(65) Prior Publication Data
US 2021/0385739 A1    Dec. 9, 2021

Related U.S. Application Data

(63) Continuation of application No. PCT/CN2020/080828, filed on Mar. 24, 2020.

(30) Foreign Application Priority Data

May 6, 2019 (CN) .......................... 201910371818.7

(51) Int. Cl.
H04W 48/16 (2009.01)
H04W 48/18 (2009.01)

(52) U.S. Cl.
CPC .......... *H04W 48/16* (2013.01); *H04W 48/18* (2013.01)

(58) Field of Classification Search
CPC . H04W 36/14; H04W 36/08; H04W 36/0016; H04W 36/0022; H04W 36/30;
(Continued)

(56) References Cited

U.S. PATENT DOCUMENTS

2009/0252059 A1* 10/2009 Vigue ................... H04L 47/122
                                                                    370/254
2017/0290074 A1* 10/2017 Lee .......................... H04W 8/18
(Continued)

FOREIGN PATENT DOCUMENTS

CN    107666723          2/2018
CN    108282840 A        7/2018
(Continued)

OTHER PUBLICATIONS

Huawei, HiSilicon, InterDigital, Update of Solution#22 with the standalone NPN architecture, Nov. 30, 2018, 10 pages.
(Continued)

*Primary Examiner* — Kwasi Karikari
(74) *Attorney, Agent, or Firm* — Sughrue Mion, PLLC (57) ABSTRACT

Embodiments of this disclosure include a network access control method and device. The method may include obtaining a network connection capability of the terminal device. The network connection capability may include a capability of connecting to a public network and a non-public network (NPN) that are mutually independent. The method may further include performing access control on the terminal device according to a network service requirement and the network connection capability of the terminal device in response to the terminal device being in a connected state.

11 Claims, 5 Drawing Sheets

(58) Field of Classification Search
CPC ......... H04W 36/0055; H04W 36/0033; H04W 36/0061; H04W 40/36; H04W 84/12; H04W 48/18; H04W 48/16; H04W 4/80; H04W 8/18; H04W 48/02; H04W 84/042; H04W 88/02; H04W 88/08; H04W 28/20; H04W 16/16; H04W 52/0245; H04W 16/28; H04W 36/00
See application file for complete search history.

(56) References Cited

U.S. PATENT DOCUMENTS

| | | | |
|---|---|---|---|
| 2018/0199273 | A1 | 7/2018 | Chun |
| 2021/0092725 | A1* | 3/2021 | Park ..................... H04W 92/12 |
| 2022/0210635 | A1* | 6/2022 | Ben Henda ........... H04L 9/0819 |

FOREIGN PATENT DOCUMENTS

| | | |
|---|---|---|
| CN | 109451829 | 3/2019 |
| CN | 110213808 | 9/2019 |
| WO | WO 2015/103344 A2 | 7/2015 |
| WO | WO 2015/103344 A3 | 7/2015 |

OTHER PUBLICATIONS

LG Electronics, Corrections to network access for non public network, Feb. 22, 2019, 4 pages.

Office Action and Search Report of Chinese Application 201910371818.7 dated Nov. 11, 2021, 7 pages.

English translation of International Search Report issued May 24, 2020 in International Application No. PCT/CN2020/080828.

"3rd Generation Partnership Project; Technical Specification Group Services and System 1-12. 21-23 Aspects; Study on SGS Enhanced support of Vertical and LAN Services" 3GPP TR 23.734 V0.3.0, Oct. 31, 2018 (Oct. 31, 2018), part 5 and part 6, referenced to in International Search Report issued May 24, 2020 in International Application No. PCT/CN2020/080828.

Ericsson. "Feasibility to support a deployment independent solution" 13-20, 21, 24-26 3GPP TSG-SA WG2 Meeting #132 82-1903383, Apr. 12, 2019 (Apr. 12, 2019), section 2, referenced to in International Search Report issued May 24, 2020 in International Application No. PCT/CN2020/080828.

Siemens AG et al. "Deployment options for non-public networks" 3GPP TSG-SA WGJ Meeting #83 81-182676, Aug. 24, 2018 (Aug. 24, 2018), entire document, referenced to in International Search Report issued May 24, 2020 in International Application No. PCT/CN2020/080828.

Office Action and Extended European Search Report issued on application No. 20801685.7, dated Jun. 28, 2022, 16 pages.

Office Action issued on Japanese Application No. 2021-541594, 4 pages.

Translation of Japanese Office Action 2021-541594, 8 pages.

$3^{rd}$ Generation Partnership Prject; Technical Specification Group Services and System Aspects; Study on enhancement of 5G System (5GS) for vertical and Local Area Network (LAN) services (Release 16).

3GPP TSG-SA WG1 Meeting #86, Suzhou, China May 6-11, 2019, 15 pages.

SA WG2 Meeting #S2-129, Oct. 15-19, 2018, Dongguan, PR. China, Ericcson, Nokia, Nokia Shanghai Bell, 9 pages.

SA WG2 Meeting #129, Oct. 15-19, 2018, Dongguan, China, Samsung, SK Telecom, 17 pages.

SA WG2 Meeting #129bis, Nov. 26-30 2018, West Palm Beach, Florida, Ericsson, Nokia, Nokia Shanghai Bell, Qualcomm Incorgorated, 8 pages.

* cited by examiner

NETWORK ACCESS CONTROL METHOD AND DEVICE, AND STORAGE MEDIUM

CROSS-REFERENCE TO RELATED APPLICATION

This application is a continuation application of PCT Patent Application No. PCT/CN2020/080828, filed on Mar. 24, 2020, which claims priority to Chinese Patent Application No. 201910371818.7, entitled "NETWORK ACCESS CONTROL METHOD AND APPARATUS, COMPUTER-READABLE MEDIUM, AND ELECTRONIC DEVICE" and filed with the National Intellectual Property Administration, PRC on May 6, 2019, wherein the content of each of the above-referenced applications is incorporated herein by reference in its entirety.

FIELD OF THE TECHNOLOGY

This application relates to the field of computer and communication technologies, and specifically, to a network access control method, a computer-readable medium, and an electronic device.

BACKGROUND OF THE DISCLOSURE

A public land mobile network (PLMN) is a public network established and operated to provide land mobile communication services to the public. With the development of network services, a non-public network (NPN) has appeared. The NPN is a network established separately for some groups of people. In a scenario where a public network and an NPN coexist, how to implement network access control becomes a technical problem that needs a prompt solution.

SUMMARY

Embodiments of this disclosure provide a network access control method, a computer-readable medium, and an electronic device, which can effectively implement network access control in an application scenario where a public network and an NPN coexist. Other features and advantages of this disclosure become obvious through the following detailed descriptions, or may be partially learned through the practice of this disclosure.

According to an aspect of the embodiments of this disclosure, a network access control method is provided. The method is applicable to a terminal device. The method may include obtaining a network connection capability of the terminal device. The network connection capability may include a capability of connecting to a public network and a non-public network (NPN) that are mutually independent. The method may further include performing access control on the terminal device according to a network service requirement and the network connection capability of the terminal device in response to the terminal device being in a connected state.

According to an aspect of the embodiments of this disclosure, a network access control method is provided. The method is applicable to a network side device. The method may include generating a network access control policy. The network access control policy may be for enabling a terminal device to perform access control according to a network service requirement and a network connection capability. The network connection capability may include a capability of connecting to a public network and a non-public network (NPN) that are mutually independent. The method may further include configuring the network access control policy for the terminal device.

According to an aspect of the embodiments of this disclosure, a network access control method is provided. The method is applicable to a network side device. The method may include generating a tracking area (TA) of a non-public network (NPN). The NPN may be a network formed using a network slice of a public network. The TA of the NPN may be different from a TA of the public network. The method may further include configuring the TA of the NPN or the TA of the public network for a terminal device within a TA configuration period, so that the terminal device in an idle state or an inactive state enters a connected state in response to a tracking area update (TAU), to obtain network access control information.

According to an aspect of the embodiments of this disclosure, a network access control method is provided. The method is applicable to a network side device. The method may include obtaining identification information of a non-public network (NPN). The NPN may be a network formed using a network slice of a public network. The identification information of the NPN may be for identifying an area in which the NPN is located. The method may further include configuring the identification information of the NPN for a terminal device, so that the terminal device in an idle state or an inactive state determines whether to search for the NPN based on the identification information of the NPN.

According to an aspect of the embodiments of this disclosure, a network access control method is provided. The method is applicable to a terminal device. The method may include obtaining identification information of a non-public network (NPN) configured by a network side device. The NPN may be a network formed using a network slice of a public network. The identification information of the NPN may be for identifying an area in which the NPN is located. The method may further include, in response to the terminal device being in an idle state or an inactive state, determining whether to search for the NPN based on the identification information of the NPN.

It is to be understood that the foregoing general descriptions and the following detailed descriptions are merely for illustration and explanation purposes and are not intended to limit this disclosure.

BRIEF DESCRIPTION OF THE DRAWINGS

Accompanying drawings herein are incorporated into a specification and constitute a part of this specification, show embodiments that conform to this disclosure, and are used for describing a principle of this disclosure together with this specification. Apparently, the accompanying drawings described below are merely some embodiments of this disclosure, and a person of ordinary skill in the art may further obtain other accompanying drawings according to the accompanying drawings without creative efforts. In the accompanying drawings.

DESCRIPTION OF EMBODIMENTS

Exemplary implementations will now be described more thoroughly with reference to the accompanying drawings. However, the exemplary implementations may be implemented in various forms, and are not to be understood as being limited to the examples described herein. Instead, the implementations are provided to make this disclosure more thorough and complete and fully convey the idea of the exemplary implementations to a person skilled in the art.

In addition, the described features, structures or characteristics may be combined in one or more embodiments in any appropriate manner. In the following descriptions, a lot of specific details are provided to give a full understanding of the embodiments of this disclosure. However, a person of ordinary skill in the art is to be aware that, the technical solutions in this disclosure may be implemented without one or more of the particular details, or another method, unit, apparatus, or step may be used. In other cases, well-known methods, apparatuses, implementations, or operations are not shown or described in detail, in order not to obscure the aspects of this disclosure.

The block diagrams shown in the accompanying drawings are merely functional entities and do not necessarily correspond to physically independent entities. That is, the functional entities may be implemented in at least one of a software form, or in one or more hardware modules or integrated circuits, or in different networks or processor apparatuses or microcontroller apparatuses.

The flowcharts shown in the accompanying drawings are merely examples for descriptions, do not need to include all content and operations (or steps), and do not need to be performed in the described orders either. For example, some operations or steps may be further divided, while some operations or steps may be combined or partially combined. Therefore, an actual execution order may change according to an actual case.

Figure 1:
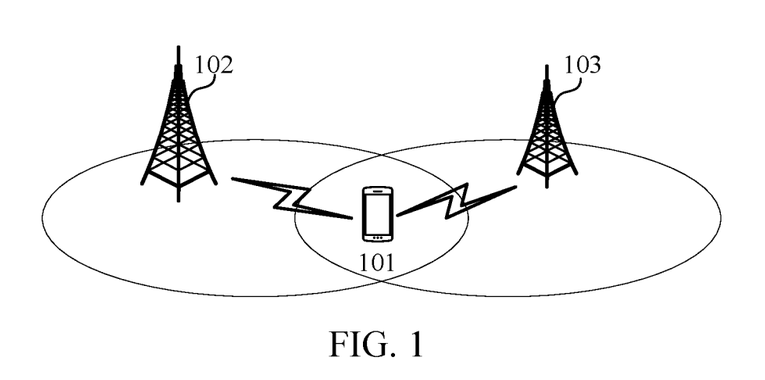
FIG. 1 is a schematic diagram of an exemplary system architecture to which a technical solution according to an embodiment of this disclosure is applicable.

FIG. 1 is a schematic diagram of an exemplary system architecture to which a technical solution according to an embodiment of this disclosure is applicable.

As shown in FIG. 1, the system architecture may include a terminal device 101, a public network base station 102, and an NPN base station 103. The terminal device 101 may be a smart phone shown in FIG. 1, or may be a tablet computer, a portable computer, a desktop computer, or the like, which is not limited in this disclosure. The public network base station 102 and the NPN base station 103 are independently deployed, and form a public network and an NPN respectively.

One terminal device 101, one public network base station 102, and one NPN base station 103 in FIG. 1 are only illustrative. According to implementation requirements, there may be any quantities of terminal devices 101, public network base stations 102, and NPN base stations 103.

In an embodiment of this disclosure, the public network base station 102 may generate a network access control policy, the network access control policy being used for enabling the terminal device 101 to perform access control according to a network service requirement and a network connection capability, the network connection capability including a capability to connect to a public network and an NPN that are mutually independent, so that the public network base station 102 may configure the network access control policy for the terminal device 101.

In an embodiment of this disclosure, after the terminal device 101 obtains the network access control policy, when the terminal device 101 is in a connected state, access control can be performed on the terminal device 101 according to the network service requirement and the network connection capability of the terminal device 101, which ensures that a communication system can support the processing of a public network service and an NPN service.

Figure 2:
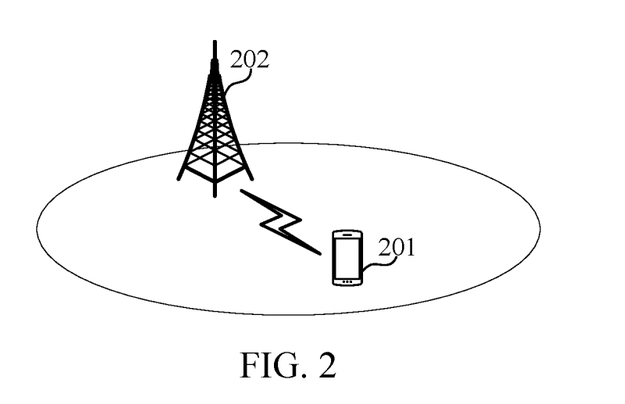
FIG. 2 is a schematic diagram of an exemplary system architecture to which a technical solution according to an embodiment of this disclosure is applicable.

FIG. 2 is a schematic diagram of an exemplary system architecture to which a technical solution according to an embodiment of this disclosure is applicable.

As shown in FIG. 2, the system architecture may include a terminal device 201 and a public network base station 202. The terminal device 201 may be a smart phone shown in FIG. 2, or may be a tablet computer, a portable computer, a desktop computer, or the like, which is not limited in this disclosure. The public network base station 202 may construct an NPN by configuring private slices.

One terminal device 201 and one public network base station 202 in FIG. 2 are only illustrative. According to implementation requirements, there may be any quantities of terminal devices 201 and any quantity of public network base stations 202.

In an embodiment of this disclosure, the public network base station 202 may generate a TA of an NPN, the TA of the NPN being different from a TA of the public network. In this case, the public network base station 202 may configure the TA of the NPN or the TA of the public network for the terminal device 201 within any TA configuration period, so that the terminal device 201 in an idle state or an inactive state enters a connected state when a TAU occurs, to obtain network access control information. That is, in this embodiment, the TAs of the public network and the NPN are not configured for the terminal device 201 simultaneously, which enables the terminal device 201 in the idle state or the inactive state to enter a connected state to obtain network access control information when the TAU occurs, to implement network access control, thereby ensuring that the communication system can support the processing of the public network service and the NPN service.

For example, the occurrence of TAU may be that the terminal device 201 enters the TA of the public network from the TA of the NPN, or enters the TA of the NPN from the TA of the public network, which is not limited in this disclosure.

Based on the system architecture shown in FIG. 2, in an embodiment of this disclosure, the public network base station 202 may obtain identification information of the NPN, the identification information of the NPN being used for identifying an area in which the NPN is located. The public network base station 202 may then configure the identification information of the NPN for the terminal device 201, so that the terminal device 201 in an idle state or an inactive state may determine, according to the identification information of the NPN, whether to search for the NPN. For example, the terminal device 201 may perform an NPN search process when the identification information of the NPN is detected, and stop, when the identification information of the NPN is not detected, searching for the NPN, thereby avoiding the increase in power consumption of the terminal device 201 caused by frequent searches for the NPN on the premise that network access control is implemented.

The implementation details of the technical solutions in the embodiments of this disclosure are described below in detail.

Figure 3:
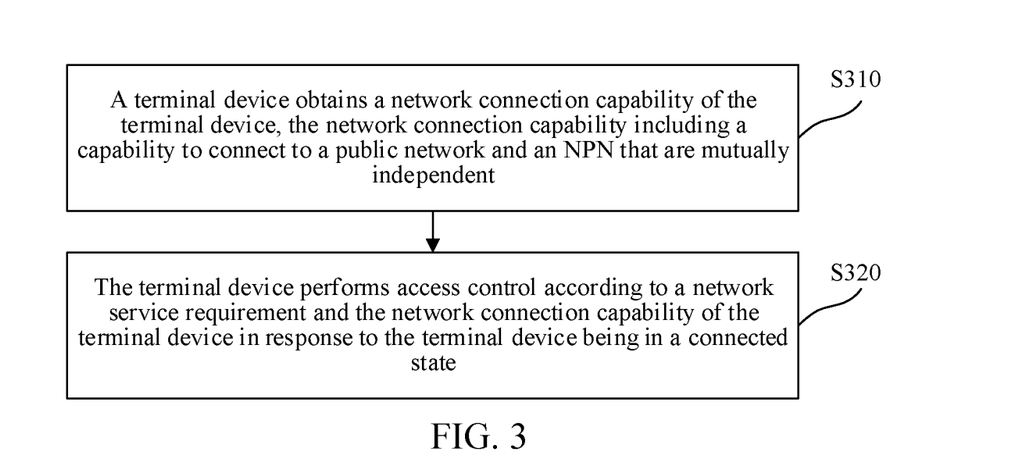
FIG. 3 is a flowchart of a network access control method according to an embodiment of this disclosure.

FIG. 3 is a flowchart of a network access control method according to an embodiment of this disclosure. The network access control method may be performed by a terminal device, and the terminal device may be the terminal device 101 shown in FIG. 1. Referring to FIG. 3, the network access control method includes at least step S310 and step S320, which are described in detail as follows:

Step S310: A terminal device obtains a network connection capability of the terminal device, the network connection capability including a capability to connect to a public network and an NPN that are mutually independent.

In an embodiment of this disclosure, the capability of the terminal device to connect to a public network and an NPN that are mutually independent may include whether the terminal device can connect to a public network, whether the terminal device can connect to an NPN, and whether the terminal device can support simultaneous connections to a public network and an NPN, which is not limited in this disclosure.

Step S320: The terminal device performs access control according to a network service requirement and the network connection capability of the terminal device of the terminal device when the terminal device is in a connected state.

In an embodiment of this disclosure, a process of performing, by the terminal device, access control according to a network service requirement and the network connection capability of the terminal device of the terminal device in step S320 may be: If it is determined according to the network connection capability that the terminal device can support simultaneous connections to a public network and an NPN, when a public network service and an NPN service need to be processed simultaneously, the terminal device is controlled to access the public network and the NPN. The technical solution of this embodiment enables simultaneous access to the public network and the NPN according to the network connection capability of the terminal device, to process the public network service and the NPN service simultaneously.

In an embodiment of this disclosure, a process of performing, by the terminal device, access control according to a network service requirement and the network connection capability of the terminal device of the terminal device in step S320 may be alternatively as follows: If it is determined according to the network connection capability of the terminal device that the terminal device does not support simultaneous connections to the public network and the NPN, the terminal device is controlled according to a network service the terminal device needs to process to access the public network or the NPN. For example, the terminal device is controlled, in response to that the terminal device needs to process a public network service, to access the public network; the terminal device is controlled, in response to that the terminal device needs to process an NPN service, to access the NPN; and the terminal device is controlled, in response to that the terminal device needs to process the public network service and the NPN service simultaneously, according to a service priority of the public network and a service priority of the NPN to access a network with a higher service priority.

In an embodiment of this disclosure, a process of performing, by the terminal device, access control according to a network service requirement and the network connection capability of the terminal device of the terminal device in step S320 may be alternatively as follows: When it is determined according to the network connection capability of the terminal device that the terminal device does not support simultaneous connections to the public network and the NPN and in response to that network quality of one of the public network and the NPN cannot meet the service requirement, the terminal device is controlled to access the other network. The technical solution of this embodiment enables the terminal device to preferentially access, when the terminal device does not support simultaneous connections to a public network and an NPN, a network that meets a service requirement.

In an embodiment of this disclosure, a process of performing, by the terminal device, access control according to a network service requirement and the network connection capability of the terminal device of the terminal device in step S320 may be alternatively as follows: When the terminal device is connected to a first network of the public network and the NPN and network quality of the first network cannot meet the service requirement and in response to that a service of the first network needs to be processed, the terminal device accesses a second network of the public network and the NPN and accesses the first network via the second network to process the service of the first network. In the technical solution of this embodiment, when the terminal device accesses the first network and network quality of the first network cannot meet the service requirement and in response to that a service of the first network needs to be processed, the terminal device may access the second network to indirectly access the first network to process the service of the first network. In this embodiment, a gateway device of the public network and a gateway device of the NPN may be connected to facilitate indirect access to the first network via the second network to process the service of the first network.

In an embodiment of this disclosure, when the terminal device is connected to a first network of the public network and the NPN and network quality of a second network of the public network and the NPN cannot meet the service requirement or the terminal device cannot connect to the second network and in response to that a service of the second network needs to be processed, the second network is indirectly accessed via the first network to process the service of the second network. In the technical solution of this embodiment, when the terminal device accesses the first network, when the terminal device fails to connect to the second network or the network quality of the second network cannot meet the service requirement, the terminal device can access the second network indirectly via the first network to process the service of the second network. In this embodiment, a gateway device of the public network and a gateway device of the NPN may be connected to facilitate indirect access to the second network via the first network to process the service of the second network.

The technical solution of the embodiment shown in FIG. 3 makes it possible to implement network access control based on the network service requirement and the network connection capability of the terminal device in an application scenario where a public network and an NPN coexist, thereby ensuring that a communication system can support the processing of a public network service and an NPN service. For example, the communication system may be a fifth-generation mobile communications technology (5G) system.

Figure 4:
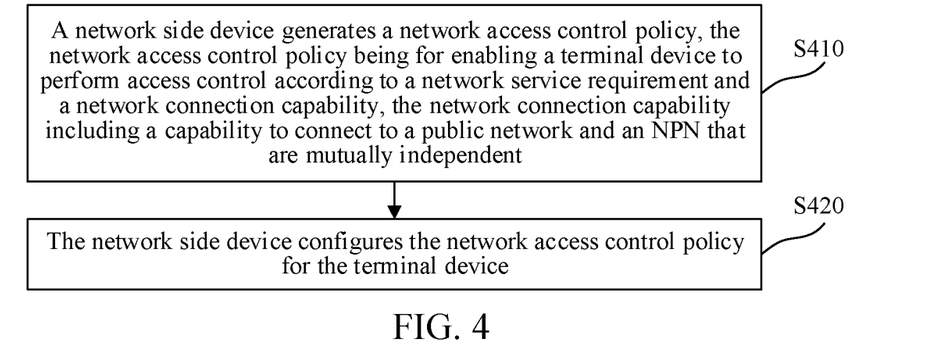
FIG. 4 is a flowchart of a network access control method according to an embodiment of this disclosure.

FIG. 4 is a flowchart of a network access control method according to an embodiment of this disclosure. The network access control method may be performed by a network side device, and the network side device may be the public network base station 102 shown in FIG. 1, or may be a network management device independent of the public network base station 102 and the NPN base station 103. Referring to FIG. 4, the network access control method includes at least step S410 and step S420, which are described in detail as follows:

Step S410: A network side device generates a network access control policy, the network access control policy being used for enabling a terminal device to perform access control according to a network service requirement and a network connection capability, the network connection capability including a capability to connect to a public network and an NPN that are mutually independent.

In an embodiment of this disclosure, the network access control policy may include a service priority of the public network and a service priority of the NPN. Therefore, when the terminal device cannot process a public network service and an NPN service simultaneously, the terminal device can select a service with a higher service priority according to the service priority of the public network and the service priority of the NPN.

In an embodiment of this disclosure, the service priorities may be represented by priorities of frequency information of networks. For example, if the priority of the frequency information in which the public network is located is higher than the priority of the frequency information in which the NPN is located, it is determined that the service priority of the public network is higher than the service priority of the NPN.

In an embodiment of this disclosure, the service priorities may be represented by priorities of network cells in the same frequency band. For example, when a network cell of the public network and a network cell of the NPN are in the same frequency band, if a priority of the network cell of the public network is higher than a priority of the network cell of the NPN, the service priority of the public network is higher than the service priority of the NPN.

Step S420: The network side device configures the network access control policy for the terminal device.

In an embodiment of this disclosure, if the terminal device is in a connected state, the network side device may directly configure the network access control policy for the terminal device by using configuration signaling. The network side device may configure, when the terminal device is in an idle state or an inactive state, the network access control policy for the terminal device by configuring a cell reselection parameter or a redirection parameter.

In an embodiment of this disclosure, the network side device may determine, according to identification information of the NPN and subscription information of the terminal device when it is detected that the terminal device needs to access the NPN, whether the terminal device can access the NPN. For example, if the terminal device signs an access protocol with an NPN, the network side device may allow the terminal device to access the NPN; and if the terminal device does not sign an access protocol with an NPN, the network side device may deny access of the terminal device to the NPN.

The technical solution of the embodiment shown in FIG. 4 also makes it possible to implement network access control based on the network service requirement and the network connection capability of the terminal device in an application scenario where a public network and an NPN coexist, thereby ensuring that a communication system can support the processing of a public network service and an NPN service.

Figure 5:
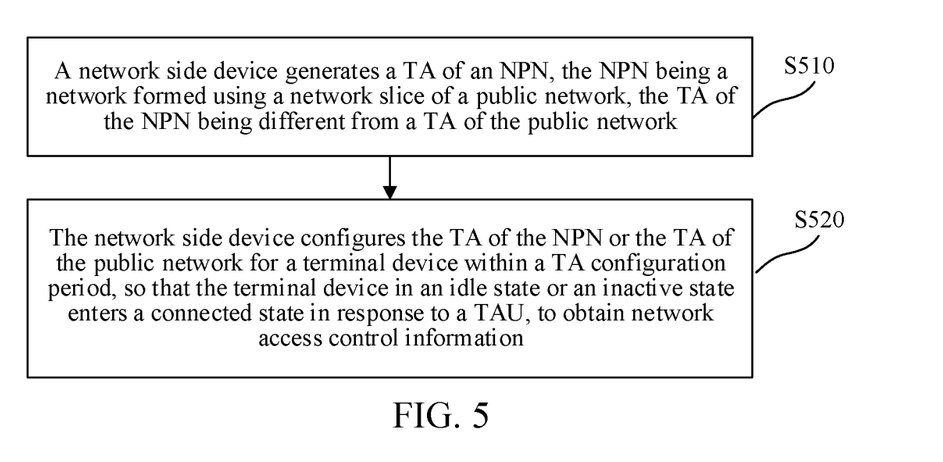
FIG. 5 is a flowchart of a network access control method according to an embodiment of this disclosure.

FIG. 5 is a flowchart of a network access control method according to an embodiment of this disclosure. The network access control method may be performed by a network side device, and the network side device may be the public network base station 202 shown in FIG. 2. Referring to FIG. 5, the network access control method includes at least step S510 and step S520, which are described in detail as follows:

Step S510: A network side device generates a TA of an NPN, the NPN being a network formed using a network slice of a public network, the TA of the NPN being different from a TA of the public network.

In an embodiment of this disclosure, network cells in the same TA support the same network slice.

Step S520: The network side device configures the TA of the NPN or the TA of the public network for a terminal device within any TA configuration period, so that the terminal device in an idle state or an inactive state enters a connected state when a TAU occurs, to obtain network access control information.

The technical solution of the embodiment shown in FIG. 5 prevents the TA of the NPN and the TA of the public network from being configured for the terminal device simultaneously. Therefore, when the terminal device is in an idle state or an inactive state and TAU does not occur, the terminal device neither moves to the public network from the NPN nor moves to the NPN from the public network. When the terminal device is in an idle state or an inactive state and TAU occurs, the terminal device enters a connected state to obtain network access control information, to implement network access control, thereby ensuring that the communication system can support the processing of the public network service and the NPN service.

Figure 6:
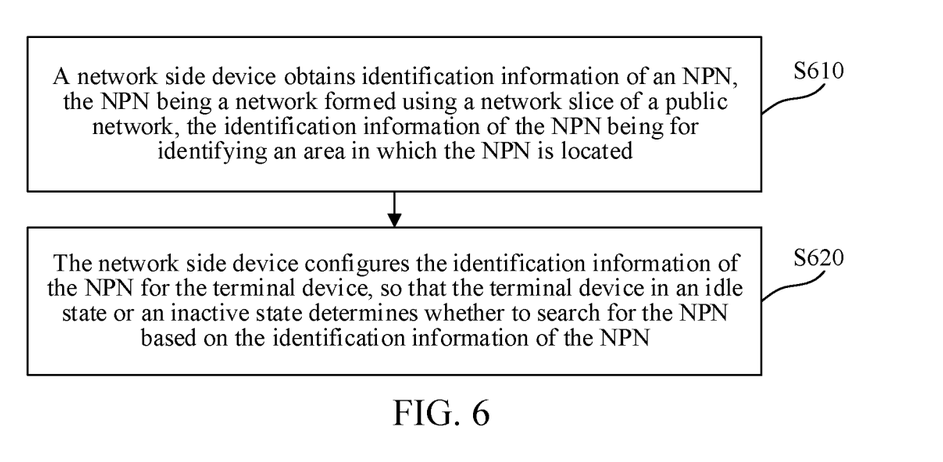
FIG. 6 is a flowchart of a network access control method according to an embodiment of this disclosure.

FIG. 6 is a flowchart of a network access control method according to an embodiment of this disclosure. The network access control method may be performed by a network side device, and the network side device may be the public network base station 202 shown in FIG. 2. Referring to FIG. 6, the network access control method includes at least step S610 and step S620, which are described in detail as follows:

Step S610: A network side device obtains identification information of an NPN, the NPN being a network formed using a network slice of a public network, the identification information of the NPN being used for identifying an area in which the NPN is located.

In an embodiment of this disclosure, the network side device may obtain the identification information of the NPN from an application function (AF) entity or a core network entity. The identification information of the NPN may include at least one of the following: location information of a network cell of the NPN, information of geographic locations covered by the NPN, and frequency information of the NPN, which is not limited in this disclosure.

Step S620: The network side device configures the identification information of the NPN for the terminal device, so that the terminal device in an idle state or an inactive state determines, according to the identification information of the NPN, whether to search for the NPN.

In an embodiment of this disclosure, the terminal device may perform an NPN search process when the identification information of the NPN is detected, and stop, when the identification information of the NPN is not detected, searching for the NPN, thereby avoiding the increase in power consumption of the terminal device caused by frequent searches for the NPN on the premise that network access control is implemented.

In an embodiment of this disclosure, the network side device may transmit configuration information to the terminal device when indication information that is transmitted by the terminal device in the idle state or the inactive state and requests access to the NPN is received, to control access of the terminal device to the NPN. The network side device may transmit configuration information to the terminal device by using radio resource control (RRC) signaling, and the configuration information may include measurement configuration information, which is not limited in this disclosure.

Figure 7:
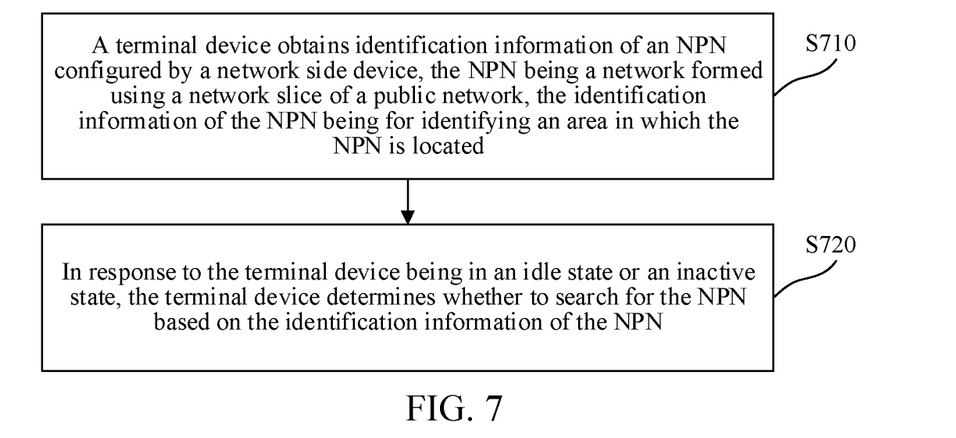
FIG. 7 is a flowchart of a network access control method according to an embodiment of this disclosure.

FIG. 7 is a flowchart of a network access control method according to an embodiment of this disclosure. The network access control method may be performed by a terminal device, and the terminal device may be the terminal device 201 shown in FIG. 2. Referring to FIG. 7, the network access control method includes at least step S710 and step S720, which are described in detail as follows:

Step S710: A terminal device obtains identification information of an NPN configured by a network side device, the NPN being a network formed using a network slice of a public network, the identification information of the NPN being used for identifying an area in which the NPN is located.

Step S720: The terminal device determines, according to the identification information of the NPN when the terminal device in an idle state or an inactive state, whether to search for the NPN.

In an embodiment of this disclosure, the terminal device may perform an NPN search process when the identification information of the NPN is detected, and stop, when the identification information of the NPN is not detected, searching for the NPN, thereby avoiding the increase in power consumption of the terminal device caused by frequent searches for the NPN on the premise that network access control is implemented.

In an embodiment of this disclosure, after the NPN is found, the terminal device transmits, when it is necessary to access the NPN, indication information requesting access to the NPN to the network side device, and performs a network access process according to configuration information fed back by the network side device for the indication information. The configuration information fed back by the network side device may include measurement configuration information, which is not limited in this disclosure.

The foregoing embodiments respectively describe the network access control solutions of the embodiments of this disclosure from the perspective of a terminal device and a network side device for the system architecture shown in FIG. 1 and the system architecture shown in FIG. 2. Details of implementing the technical solutions of the embodiments of this disclosure are described below from the perspective of a whole system (including a terminal device and a network side device).

As shown in FIG. 1 and FIG. 2, deployment modes between a PLMN and an NPN may include the following two modes:

Mode 1: An NPN is deployed independently.

In Mode 1, core network elements in the NPN are all deployed by a third party, and the third party solves the spectrum problem independently without relying on functions provided in the public network. This mode is suitable for scenarios and industries that have strong demands for local networks. This mode can strictly isolate a local network from a public network.

Mode 2: An NPN is integrated with a public network.

In Mode 2, core network elements (including base stations) in the NPN are all shared with the PLMN. The NPN implements the isolation of service data from the PLMN in a manner of a private slice, and introduces a new user group management mechanism to implement management. This mode is suitable for a scenario where local deployment of hardware is unexpected. The isolated NPN and PLMN may be distinguished by using network slices or protocol data unit (PDU) sessions and quality of service (QoS) flows.

For Mode 1, when the terminal device is in a connected state, the access control problem of the terminal device may be solved in the following ways:

In an embodiment of this disclosure, when the terminal device is in a connected state, a network service requirement and a network connection capability of the terminal device need to be considered for the handover between the PLMN and the NPN. For example, if it is necessary to support the processing of a PLMN service and an NPN service simultaneously and the network connection capability of the terminal device supports the establishment of connections to the two networks simultaneously, the terminal device may initiate another connection without interrupting the PLMN service or the NPN service in the handover process. That is, the terminal device can connect to the PLMN and the NPN simultaneously, unless the coverage of the NPN or the PLMN can no longer support the network connection of the terminal device.

In an embodiment of this disclosure, if it is necessary to support the processing of a PLMN service and an NPN service simultaneously but the terminal device does not support the establishment of connections to the two networks simultaneously and if the coverage and signal strength of both the two networks meet a service requirement, a connection to the PLMN or the NPN may be selected according to a service priority. If the coverage and signal strength of only one network of the two networks meet a service requirement, the terminal device connects to the network.

In an embodiment of this disclosure, it may be determined based on a network identifier and subscription information of a user whether the terminal device can access the NPN.

In an embodiment of this disclosure, the network side device needs to configure corresponding policies such as a service priority and an access control policy for the terminal device in advance. The service priority may be represented by location information such as frequency information or cell identification within the same frequency.

In an embodiment of this disclosure, for the terminal device in an idle state and an inactive state, an NPN-related priority and location range information may be configured by configuring a cell reselection parameter or a redirection parameter in an RRC connection release process.

Figure 8:
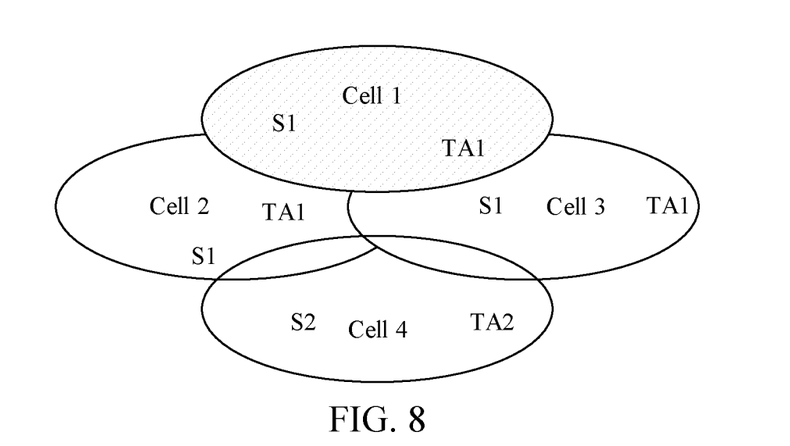
FIG. 8 is a schematic diagram of locations of network cells according to an embodiment of this disclosure.

For Mode 2, when the terminal device is in a connected state, access control may be implemented directly by using a network slice. When the terminal device is in an idle state and an inactive state, the access control problem of the terminal device may be solved in the following ways:

In an embodiment of this disclosure, dedicated TAs may be configured for NPN cells. Space division multiplexing may be performed on the TAs. That is, the TAs may appear in different locations and are exclusive to the NPN. As shown in FIG. 8, a cell 1, a cell 2, and a cell 3 are PLMN cells, and are configured with a TA1; and a cell 4 is an NPN cell, and is configured with a TA2. The cells in the same TA support the same slice. For example, all the three cells in the TA1 support a slice S1, and the cell in the TA2 supports a slice S2. In addition, the network side device needs to be configured to ensure that the TA of the PLMN cells and the TA of the NPN cell are not configured for the terminal device simultaneously.

According to the technical solution of this embodiment, the terminal device in an idle state and an inactive state undergoes a TAU process during reselection from the PLMN to the NPN or from the NPN to the PLMN, and the terminal device then enters a connected state to obtain NPN-related configuration and implement access control. In addition, if TAU does not occur for the terminal device, there is no transition from accessing the PLMN to accessing the NPN or from accessing the NPN to accessing the PLMN.

With the support of the foregoing scheme, the terminal device may perform an access control process without using a closed access group (CAG) identification mechanism.

For Mode 2, in another embodiment of this disclosure, a controllable NPN search may be implemented based on location information and a fingerprint. For example, a third-party application server AF may be used to implement a controllable NPN discovery process based on fingerprint information. Specifically, an AF or other core network elements may push NPN fingerprint information to the terminal device. The fingerprint information may include location information formed by cell identification, global navigation satellite system (GNSS) geographic location information, frequency information, and the like. Therefore, when the terminal device is moving in an idle state or an inactive state, it may be determined according to fingerprint information of the NPN whether the terminal device needs to search for an NPN, thereby avoiding the increase in power consumption of the terminal device caused by frequent searches.

In an embodiment of this disclosure, if the terminal device needs to enter a connected state to perform an access authentication process, the terminal device may indicate to the network side device that the terminal device intends to perform access control and therefore enters a connected state. The network side device may perform measurement configuration or other configuration on the terminal device by using RRC signaling to complete an access control process in Mode 2.

The following describes apparatus embodiments of this disclosure, which may be used for implementing the network access control method in the foregoing embodiments of this disclosure. For details that are not disclosed in the apparatus embodiments of this disclosure, refer to the foregoing embodiments of the network access control method of this disclosure.

Figure 9:
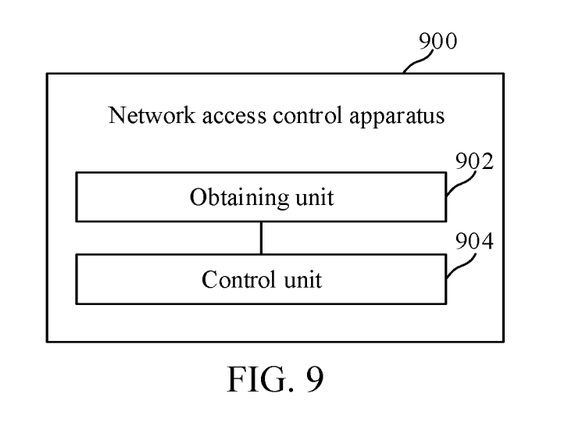
FIG. 9 is a block diagram of a network access control apparatus according to an embodiment of this disclosure.

FIG. 9 is a block diagram of a network access control apparatus according to an embodiment of this disclosure.

Referring to FIG. 9, a network access control apparatus 900 according to an embodiment of this disclosure includes an obtaining unit 902 and a control unit 904.

The obtaining unit 902 is configured to obtain a network connection capability of a terminal device, the network connection capability including a capability to connect to a public network and an NPN that are mutually independent. The control unit 904 is configured to perform access control on the terminal device according to a network service requirement and the network connection capability of the terminal device when the terminal device is in a connected state.

In some embodiments of this disclosure, the control unit 904 is configured to control, when it is determined according to the network connection capability that the terminal device can support simultaneous connections to the public network and the NPN and in response to that the terminal device needs to process a public network service and an NPN service simultaneously, the terminal device to access the public network and the NPN.

In some embodiments of this disclosure, the control unit 904 is configured to: control, when it is determined according to the network connection capability that the terminal device does not support simultaneous connections to the public network and the NPN, the terminal device according to a network service the terminal device needs to process to access the public network or the NPN.

In some embodiments of this disclosure, the control unit 904 is configured to: control, in response to that the terminal device needs to process a public network service, the terminal device to access the public network; control, in response to that the terminal device needs to process an NPN service, the terminal device to access the NPN; and control, in response to that the terminal device needs to process the public network service and the NPN service simultaneously, the terminal device according to a service priority of the public network and a service priority of the NPN to access a network with a higher service priority.

In some embodiments of this disclosure, the control unit 904 is configured to: control, when it is determined according to the network connection capability that the terminal device does not support simultaneous connections to the public network and the NPN and in response to that network quality of one of the public network and the NPN cannot meet the service requirement, the terminal device to access the other network.

In some embodiments of this disclosure, the control unit 904 is configured to: when the terminal device is connected to a first network of the public network and the NPN and network quality of the first network cannot meet the service requirement and in response to that a service of the first network needs to be processed, control the terminal device to access a second network of the public network and the NPN, and access the first network via the second network to process the service of the first network.

In some embodiments of this disclosure, the control unit 904 is further configured to: when the terminal device is connected to a first network of the public network and the NPN and network quality of a second network of the public network and the NPN cannot meet the service requirement or the terminal device cannot connect to the second network and in response to that a service of the second network needs to be processed, access the second network via the first network to process the service of the second network.

In some embodiments of this disclosure, based on the foregoing solution, a gateway device of the public network is connected to a gateway device of the NPN.

The technical solution of the embodiments of this disclosure makes it possible to implement network access control based on the network service requirement and the network connection capability of the terminal device in an application scenario where a public network and an NPN coexist, thereby ensuring that a communication system can support the processing of a public network service and an NPN service.

Figure 10:
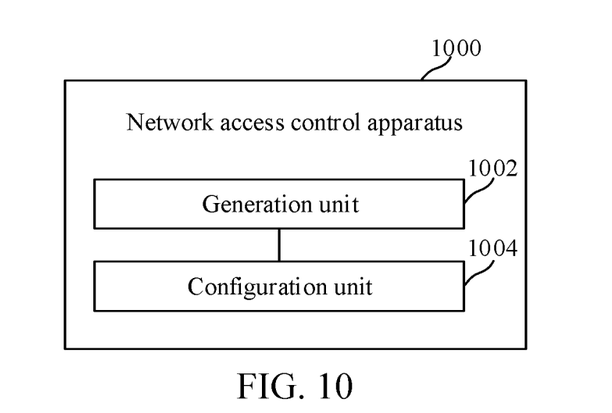
FIG. 10 is a block diagram of a network access control apparatus according to an embodiment of this disclosure.

FIG. 10 is a block diagram of a network access control apparatus according to an embodiment of this disclosure.

Referring to FIG. 10, a network access control apparatus 1000 according to an embodiment of this disclosure includes a generation unit 1002 and a configuration unit 1004.

The generation unit 1002 is configured to generate a network access control policy, the network access control policy being used for enabling a terminal device to perform access control according to a network service requirement and a network connection capability, the network connection capability including a capability to connect to a public network and an NPN that are mutually independent; and the configuration unit 1004 is configured to configure the network access control policy for the terminal device.

In some embodiments of this disclosure, the network access control policy includes a service priority of the public network and a service priority of the NPN, the service priorities being represented by priorities of frequency information of the networks, or the service priorities being represented by priorities of network cells in the same frequency band.

In some embodiments of this disclosure, the configuration unit 1004 is configured to: configure, when the terminal device is in an idle state or an inactive state, the network access control policy for the terminal device by configuring a cell reselection parameter or a redirection parameter.

In some embodiments of this disclosure, the network access control apparatus 1000 further includes: a determining unit, configured to determine according to identification information of the NPN and subscription information of the terminal device when it is detected that the terminal device needs to access the NPN, whether the terminal device can access the NPN.

The technical solution of the embodiments of this disclosure also makes it possible to implement network access control based on the network service requirement and the network connection capability of the terminal device in an application scenario where a public network and an NPN coexist, thereby ensuring that a communication system can support the processing of a public network service and an NPN service.

Figure 11:
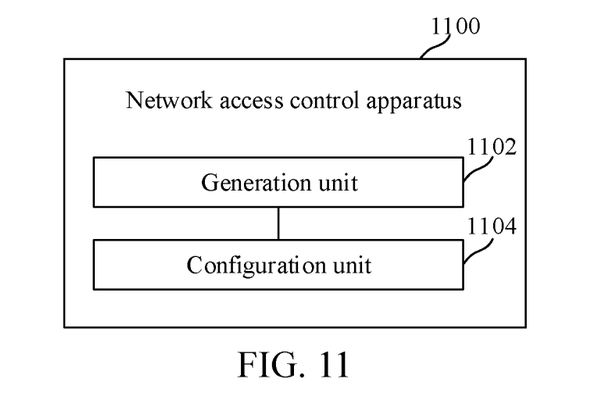
FIG. 11 is a block diagram of a network access control apparatus according to an embodiment of this disclosure.

FIG. 11 is a block diagram of a network access control apparatus according to an embodiment of this disclosure.

Referring to FIG. 11, a network access control apparatus 1100 according to an embodiment of this disclosure includes a generation unit 1102 and a configuration unit 1104.

The generation unit 1102 is configured to generate a TA of an NPN, the NPN being a network formed using a network slice of a public network, the TA of the NPN being different from a TA of the public network. The configuration unit 1104 is configured to configure the TA of the NPN or the TA of the public network for a terminal device within any TA configuration period, so that the terminal device in an idle state or an inactive state enters a connected state when a TAU occurs, to obtain network access control information.

In some embodiments of this disclosure, based on the foregoing solution, network cells in the same TA support the same network slice.

The technical solution of the embodiments of this disclosure prevents the TA of the NPN and the TA of the public network from being configured for the terminal device simultaneously. Therefore, when the terminal device is in an idle state or an inactive state and TAU does not occur, the terminal device neither moves to the public network from the NPN nor moves to the NPN from the public network. When the terminal device is in an idle state or an inactive state and TAU occurs, the terminal device can enter a connected state to obtain network access control information, to implement network access control, thereby ensuring that the communication system can support the processing of the public network service and the NPN service.

Figure 12:
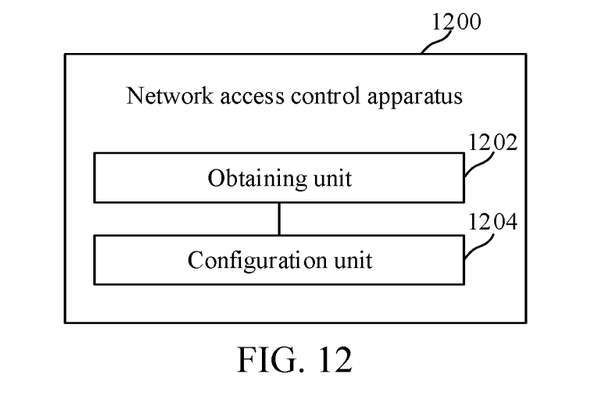
FIG. 12 is a block diagram of a network access control apparatus according to an embodiment of this disclosure.

FIG. 12 is a block diagram of a network access control apparatus according to an embodiment of this disclosure.

Referring to FIG. 12, a network access control apparatus 1200 according to an embodiment of this disclosure includes an obtaining unit 1202 and a configuration unit 1204.

The obtaining unit 1202 is configured to obtain identification information of an NPN, the NPN being a network formed using a network slice of a public network, the identification information of the NPN being used for identifying an area in which the NPN is located. The configuration unit 1204 is configured to configure the identification information of the NPN for the terminal device, so that the terminal device in an idle state or an inactive state determines, according to the identification information of the NPN, whether to search for the NPN.

In some embodiments of this disclosure, the network access control apparatus 1200 further includes: a transmission unit, configured to transmit configuration information to the terminal device when indication information that is transmitted by the terminal device in the idle state or the inactive state and requests access to the NPN is received, to control access of the terminal device to the NPN.

In some embodiments of this disclosure, the identification information of the NPN includes at least one of the following: location information of a network cell of the NPN, information of geographic locations covered by the NPN, and frequency information of the NPN.

In the technical solution provided in the embodiments of this disclosure, the identification information of the NPN is obtained, and the identification information of the NPN is used for identifying an area in which the NPN is located. The identification information of the NPN is configured for the terminal device, so that the terminal device in the idle state or the inactive state may determine, according to the identification information of the NPN, whether to search for the NPN. For example, the terminal device may perform an NPN search process when the identification information of the NPN is detected, and stop, when the identification information of the NPN is not detected, searching for the NPN, thereby avoiding the increase in power consumption of the terminal device caused by frequent searches for the NPN on the premise that network access control is implemented.

Figure 13:
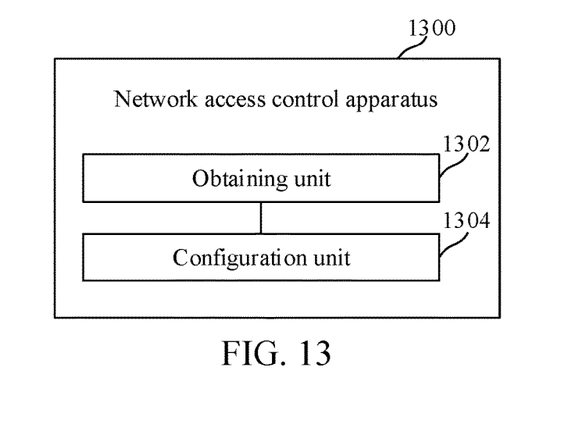
FIG. 13 is a block diagram of a network access control apparatus according to an embodiment of this disclosure.

FIG. 13 is a block diagram of a network access control apparatus according to an embodiment of this disclosure.

Referring to FIG. 13, a network access control apparatus 1300 according to an embodiment of this disclosure includes an obtaining unit 1302 and a configuration unit 1304.

The obtaining unit 1302 is configured to obtain identification information of an NPN configured by a network side device, the NPN being a network formed using a network slice of a public network, the identification information of the NPN being used for identifying an area in which the NPN is located. The configuration unit 1304 is configured to determine, according to the identification information of the NPN when the terminal device in an idle state or an inactive state, whether to search for the NPN.

In some embodiments of this disclosure, the configuration unit 1304 is configured to: perform a search process on the NPN when the identification information of the NPN is detected; and stop, when the identification information of the NPN is not detected, searching for the NPN.

In some embodiments of this disclosure, the configuration unit 1304 is further configured to: transmit, when it is necessary to access the NPN, indication information requesting access to the NPN to the network side device, and perform a network access process according to configuration information fed back by the network side device for the indication information.

In the technical solution provided in the embodiments of this disclosure, the identification information of the NPN is obtained, and the identification information of the NPN is used for identifying an area in which the NPN is located. The identification information of the NPN is configured for the terminal device, so that the terminal device in the idle state or the inactive state may determine, according to the identification information of the NPN, whether to search for the NPN. For example, the terminal device may perform an NPN search process when the identification information of the NPN is detected, and stop, when the identification information of the NPN is not detected, searching for the NPN, thereby avoiding the increase in power consumption of the terminal device caused by frequent searches for the NPN on the premise that network access control is implemented.

Figure 14:
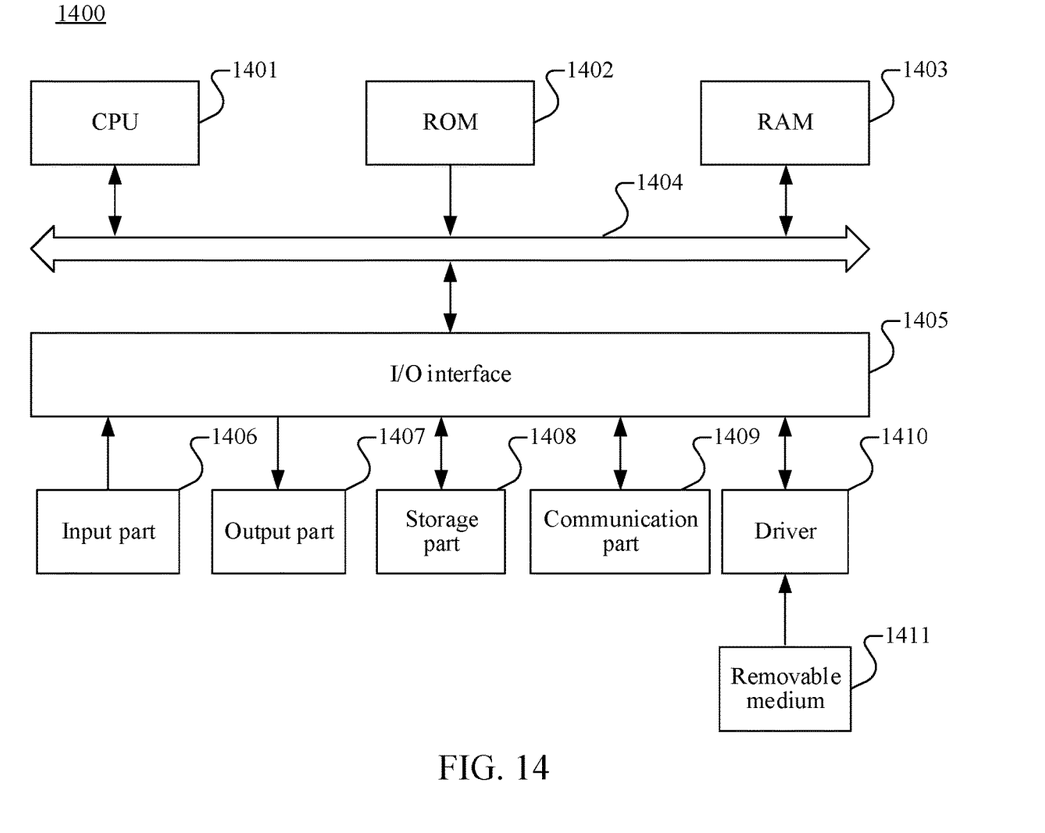
FIG. 14 is a schematic diagram of a computer system adapted to implement an electronic device according to an embodiment of this disclosure.

FIG. 14 is a schematic structural diagram of a computer system adapted to implement an electronic device according to an embodiment of this disclosure.

A computer system 1400 of the electronic device shown in FIG. 14 is merely an example, and does not constitute any limitation on functions and use ranges of the embodiments of this disclosure.

As shown in FIG. 14, the computer system 1400 includes a central processing unit (CPU) 1401, which may perform various suitable actions and processing based on a program stored in a ROM 1402 or a program loaded from a storage part 1408 into a random access memory (RAM) 1403, for example, perform the method described in the foregoing embodiments. The RAM 1403 further stores various programs and data required for system operations. The CPU 1401, the ROM 1402, and the RAM 1403 are connected to each other through a bus 1404. An input/output (I/O) interface 1405 is also connected to the bus 1404.

The following components are connected to the I/O interface 1405: an input part 1406 including a keyboard, a mouse, or the like, an output part 1407 including a cathode ray tube (CRT), a liquid crystal display (LCD), a speaker, or the like, a storage part 1408 including a hard disk, or the like, and a communication part 1409 including a network interface card such as a local area network (LAN) card or a modem. The communication part 1409 performs communication processing by using a network such as the Internet. A driver 1410 is also connected to the I/O interface 1405 as required. A removable medium 1411, such as a magnetic disk, an optical disc, a magneto-optical disk, or a semiconductor memory, is installed on the drive 1410 as required, so that a computer program read from the removable medium is installed into the storage part 1408 as required.

Particularly, according to an embodiment of this disclosure, the processes described in the following by referring to the flowcharts may be implemented as computer software programs. For example, an embodiment of this disclosure includes a computer program product. The computer program product includes a computer program hosted on a computer-readable medium. The computer program includes program code for performing the method shown in the flowchart. In such an embodiment, the computer program may be downloaded and installed through the communication part 1409 from a network, and/or installed from the removable medium 1411. When the computer program is executed by the CPU 1401, the various functions defined in the system of this disclosure are executed.

The computer-readable medium shown in the embodiments of this disclosure may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disk read-only memory (CD-ROM), an optical storage device, a magnetic storage device, or any appropriate combination thereof. In this disclosure, the computer-readable storage medium may be any tangible medium containing or storing a program, and the program may be used by or used in combination with an instruction execution system, an apparatus, or a device. In this disclosure, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The program code included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of this disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. It is also to be noted that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

That is, the technical solution in the embodiments of this disclosure provides an electronic device, including:
one or more processors; and
a storage apparatus, configured to store one or more programs, the one or more programs, when executed by the one or more processors, causing the one or more processors to implement the network access control method shown in FIG. 3 according to the embodiments.

That is, the technical solution in the embodiments of this disclosure further provides an electronic device, including:
one or more processors; and
a storage apparatus, configured to store one or more programs, the one or more programs, when executed by the one or more processors, causing the one or more processors to implement the network access control method shown in FIG. 4 according to the embodiments.

That is, the technical solution in the embodiments of this disclosure further provides an electronic device, including:
one or more processors; and
a storage apparatus, configured to store one or more programs, the one or more programs, when executed by the one or more processors, causing the one or more processors to implement the network access control method shown in FIG. 5 according to the embodiments.

That is, the technical solution in the embodiments of this disclosure further provides an electronic device, including:
one or more processors; and
a storage apparatus, configured to store one or more programs, the one or more programs, when executed by the one or more processors, causing the one or more processors to implement the network access control method shown in FIG. 6 according to the embodiments.

That is, the technical solution in the embodiments of this disclosure further provides an electronic device, including:
one or more processors; and
a storage apparatus, configured to store one or more programs, the one or more programs, when executed by the one or more processors, causing the one or more processors to implement the network access control method shown in FIG. 7 according to the embodiments.

According to another aspect, this disclosure further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the network access control method performed by a terminal device or the network access control method performed by a network side device according to the foregoing embodiments.

Although a plurality of modules or units of a device configured to perform actions are discussed in the foregoing detailed description, such division is not mandatory. According to the implementations of this disclosure, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the implementations of this disclosure may be implemented in a form of a software product. The software product may be stored in a non-volatile storage medium (which may be a CD-ROM, a USB flash drive, a removable hard disk, or the like) or on a network, and includes several instructions for instructing a computing device (which may be a personal computer, a server, a touch terminal, network side device, or the like) to perform the methods according to the implementations of this disclosure.

After considering the specification and practicing the implementations of the present disclosure, a person skilled in the art may easily conceive of other implementations of this disclosure. This disclosure is intended to cover any variations, uses, or adaptive changes of this disclosure. These variations, uses, or adaptive changes follow the general principles of this disclosure and include common general knowledge or common technical means in the art, which are not disclosed in this disclosure.

It is to be understood that this disclosure is not limited to the precise structures described above and shown in the accompanying drawings, and various modifications and changes can be made without departing from the scope of this disclosure. The scope of this disclosure is subject only to the appended claims.

What is claimed is:

1. A network access control method performed by a network side device, comprising:
generating a network access control policy, the network access control policy being for enabling a terminal device to perform access control according to a network service requirement and a network connection capability, the network connection capability comprising a capability of connecting to a public network and a non-public network (NPN) that are mutually independent; and
in response to the terminal device being in an idle state or an inactive state, configuring the network access control policy for the terminal device,
wherein the network access control policy comprises a service priority of the public network and a service priority of the NPN,
the service priorities being represented by priorities of frequency information of the networks, or the service priorities being represented by priorities of network cells in a same frequency band.

2. The network access control method of claim 1, wherein the configuring the network access control policy for the terminal device comprises:
configuring the network access control policy for the terminal device by configuring a cell reselection parameter or a redirection parameter.

3. The network access control method of claim 1, wherein the method further comprises:
in response to detecting that the terminal device is to access the NPN, determining whether the terminal device is able to access the NPN based on identification information of the NPN and subscription information of the terminal device.

4. The network access control method of claim 1, wherein the service priorities are represented by the priorities of frequency information of the networks.

5. The network access control method of claim 1, wherein the service priorities are represented by the priorities of network cells in the same frequency band.

6. A network side device, comprising:
   a memory storing instructions; and
   one or more hardware processors configured to execute the instructions to implement:
      generating code configured to cause the one or more processors to generate a network access control policy, the network access control policy being for enabling a terminal device to perform access control according to a network service requirement and a network connection capability, the network connection capability comprising a capability of connecting to a public network and a non-public network (NPN) that are mutually independent; and
      configured code configured to cause the one or more processors to, in response to the terminal device being in an idle state or an inactive state, configure the network access control policy for the terminal device, wherein
   the network access control policy comprises a service priority of the public network and a service priority of the NPN, and
   the service priorities being represented by priorities of frequency information of the networks, or the service priorities being represented by priorities of network cells in a same frequency band.

7. The network side device according to claim 6, wherein the configuring the network access control policy for the terminal device comprises:
   configuring the network access control policy for the terminal device by configuring a cell reselection parameter or a redirection parameter.

8. The network side device according to claim 6, wherein the one or more hardware processors are further configured to execute the instructions to implement:
   determining code configured to cause the one or more hardware processors to, in response to detecting that the terminal device is to access the NPN, determine whether the terminal device is able to access the NPN based on identification information of the NPN and subscription information of the terminal device.

9. A non-transitory computer readable medium storing a program causing a computer to:
   generate a network access control policy, the network access control policy being for enabling a terminal device to perform access control according to a network service requirement and a network connection capability, the network connection capability comprising a capability of connecting to a public network and a non-public network (NPN) that are mutually independent; and
   in response to the terminal device being in an idle state or an inactive state, configure the network access control policy for the terminal device, wherein
   the network access control policy comprises a service priority of the public network and a service priority of the NPN, and
   the service priorities being represented by priorities of frequency information of the networks, or the service priorities being represented by priorities of network cells in a same frequency band.

10. The non-transitory computer readable medium according to claim 9, wherein the configuring the network access control policy for the terminal device comprises:
    configuring the network access control policy for the terminal device by configuring a cell reselection parameter or a redirection parameter.

11. The non-transitory computer readable medium according to claim 9, wherein the program further causing the computer to:
    in response to detecting that the terminal device is to access the NPN, determine whether the terminal device is able to access the NPN based on identification information of the NPN and subscription information of the terminal device.

* * * * *